Patented Aug. 15, 1950

2,518,439

UNITED STATES PATENT OFFICE 2,518,439

DRILLING MUD

Paul W. Fischer, Long Beach, and Raymond A. Rogers, Wilmington, Calif., assignors to Union Oil Company of California, Los Angeles, Calif., a corporation of California No Drawing. Application July 27, 1946, Serial No. 686,726

17 Claims. (Cl. 252—8.5)

This invention relates to the treatment of drilling fluids such as are employed in the drilling of oil and gas wells.

In general a drilling fluid particularly that employed for rotary drilling operations, which is also termed a "drilling mud" or simply "a mud," is a colloidal suspension of clay in water to which other materials such as barium sulfate may be added in order to increase its apparent specific gravity. The physical characteristics of these clay suspensions are largely determined by the properties of the individual clay particles, most important of which are size, shape and surface characteristics.

Until recently it has been considered that the principal functions of a mud in drilling operations are three-fold: it should form a cake on the wall of the hole; it should retain in suspension the cuttings formed so that the latter may be removed from the hole along with the mud; and it should possess sufficient weight to overcome any pressure encountered during drilling. These functions are considered in more detail below.

One of the primary difficulties encountered in the drilling of wells is that due to the sloughing or caving into the hole of the formations penetrated. The use of a drilling mud is supposed to lessen the tendency for caving by "mudding-off" the formations, that is, forming a cake on the walls of the hole. It is recognized, however, that drilling fluids prepared from natural clays vary widely in their ability to prevent sloughing of formations and that those fluids which form a thin gelatinous cake on the walls of the hole and have a minimum tendency to lose water to the surrounding formations are the most desirable.

In order for drilling to proceed smoothly, means must be provided for continuously removing the cuttings from the hole and to this end drilling mud is circulated through the hole. The mud must be of sufficiently low viscosity to allow it to be readily pumped and it should be thixotropic. Thixotropy is that property of colloidal suspension which involves an increase in gel strength as a function of the time of quiescent standing. This property is valuable in that it prevents, to a large extent, the sedimentation of the cuttings in the hole during periods of suspended circulation. However, immediately after violent agitation, such as is induced by the circulation of the mud, cuttings will settle a short distance and this fact is utilized for their removal in a settling tank provided for the purpose and in which the degree of agitation is suddenly lowered to practically zero. Normally, a mud which has proper wall building characteristics and is pumpable will have adequate thixotropic properties.

Obviously, the total weight of a mud must be sufficiently great to prevent blow-outs from any high pressure formations that may be encountered, but beyond this point, the need for greater weight is problematical. A rapid reduction in the hydrostatic head maintained on formations, caused by a reduction in the specific weight of the mud or by permitting the level of the mud in the well to fall while removing the drilling tools from the hole may cause dangerous caving. Therefore, mud is usually pumped into the well while removing the drill string in order to maintain a substantially constant hydrostatic head on the formations being drilled and the mud gravity is always kept as constant as practical. In general, the practice has been to keep the weight of mud only sufficiently high to prevent blow-outs. It is common practice to increase the specific gravity of a mud by adding insoluble materials of high density, such as for example, barium sulfate, iron oxide, etc. Because of their insolubility, the usual weighting agents employed have little effect on the performance characteristics of a mud.

Of the various characteristics of a drilling mud, the most important is its tendency to lose water to the formation. It has been found that the structural strengths of most formations which are penetrated during drilling are sufficient to prevent the walls of the hole from caving, but that many such formations are weakened from being saturated or even partially saturated with water. Frequently such action causes sloughing of the formation into the hole with a resultant seizing of the drill pipe or tools so that they cannot be removed and costly fishing jobs result. It is, therefore, of the greatest importance to prevent loss of water from the drilling mud to the formations drilled. The ideal drilling fluid should permit very little if any loss of water to the formation and should deposit only a relatively thin mud cake on the walls of the hole.

As has been mentioned hereinabove, the most important physical characteristic of a drilling mud is its ability to form a thin impervious cake on the walls of the hole thereby sealing formations against infiltration of water. The terms cake-forming and water-loss properties, sealing properties and, as will be brought out hereinbelow, filtration characteristics or filter rate are used synonymously throughout this specification to denote this characteristic.

A measure of the tendency for a mud to lose water to the formations being drilled and to form a thin impervious cake upon the wall of the hole can be obtained by means of a simple filtration test. In fact, the sealing properties of the mud are almost entirely dependent upon the character of the mud-cake formed when the latter is pressed against a membrane or filter permeable to water and are very largely independent of the character of the membrane or filter employed. As a consequence, the "filtration rate" of a mud becomes of prime importance in determining the quality of the mud.

The procedure for determining filtration rate is decribed in "Recommended Practice on Standard Field Procedure for Testing Drilling Fluids," A. P. I. Code No. 29, second edition, published July, 1942, page 11, and consists in measuring the total volume of filtrate water obtained during a given time inerval of pressure filtration. The amount of filtrate obtained in the first five minutes of filtration can be used as an indication of the relative quality of various muds. A more accurate evaluation is obtained from the volume of filtrate collected in the first fifteen minutes of filtration. An even better procedure is to determine the total volume of filtrate in the first hour of filtration. Numerous correlations between such tests and actual drilling experience with the same muds have shown that the muds yielding a total filtrate of less than 30 ml. in the first hour's filtration period are usually very satisfactory. On the other hand, muds yielding a total filtrate in excess of 45 ml. under similar circumstances have been found dangerous to use, particularly when drilling through formations which are readily softened by penetration of water, as cave-ins are liable to occur. Under some circumstances, particularly when drilling surface formations, or formations at moderate depth, the permissible maximum filtration rate of the mud may be as high as about 55 ml. of total filtrate in the first hour of filtration. A mud which yields a total filtrate of 30 ml. in the first hour's filtration period will yield about 7 ml. of filtrate in the first five minutes and about 15 ml. of filtrate in the first fifteen minutes of filtration. Similarly a mud which yields a filtrate of 45 ml. in the first hour of filtration will give approximately 11 ml. in the first five minutes and about 22 ml. in the first fifteen minutes of filtration. A mud which is satisfactory for drilling operations will under the conditions of this test, deposit a filter cake of not over one-quarter inch in thickness and of a soft, plastic or gelatinous texture, whereas muds exhibiting unsatisfactory filter rates tend to deposit a thick, tough mud cake. Normally, as has already been mentioned hereinabove, muds possessing acceptable filtering characteristics form good mud cakes and, therefore, in practice only the "filtering rate" is ordinarily observed.

From the foregoing, it may be concluded that in preparing or treating a drilling mud in order to endow it with properties which will tend to insure satisfactory performance in the field, it is desirable that the treated mud when tested, as above described, yield a total filtrate of not over 55 ml. in the first hour of filtration, and preferably less than 30 ml. of filtrate, and that the deposited cake be preferably less than one-quarter inch in thickness and of a soft gelatinous texture.

It has also been observed that if the water losses from the drilling fluid to the formations being drilled contains a dissolved salt or mixture of salts, such as for example sodium chloride and calcium chloride, in appreciable quantity, there is less tendency for swelling of the formation to occur. In the production zone this is particularly important and is reflected in an increased rate of production from the well. Accordingly, in many cases it is desirable to incorporate a salt, such as for example sodium chloride, in drilling mud to the extent of 1% to 5% or as much as 10% by weight of the total mud, or even more. However, the addition of such quantities of a salt usually have an adverse effect upon the water loss characteristics of the mud and it is necessary to control the performance characteristics of a "salt-base" mud by the addition of treating agents.

As has already been mentioned hereinabove, a mud in order to be usable, must be capable of being readily and easily circulated by means of a pump such as is ordinarily employed for the purpose in the field. From a practical standpoint, it has been found that within certain limits the more readily the mud can be circulated, the faster will drilling proceed. With many muds it has been observed that if their Marsh funnel viscosities, as determined by the 500 ml. in and 500 ml. out method, is in excess of 55 seconds they may exhibit impaired circulation rates. On the other hand, it has now been observed that certain materials when added to control water loss may result in muds having viscosities in excess of 55 seconds but which are readily pumpable in actual practice.

In so far as the drilling operation and the subsequent production rate are concerned the most important characteristic of a drilling mud is its filtering rate and the viscosity of the mud need only be such that it is pumpable. Throughout this specification and the claims, wherever the terms viscosity, Marsh viscosity, apparent viscosity or funnel viscosity are employed, they relate to the viscosity as determined by means of the above test, a description of which can be found in "Recommended Practice on Standard Field Procedure for Testing Drilling Fluids," A. P. I. Code No. 29, second edition, published July 1942, page 6, except that 500 ml. of mud is measured into the funnel and the time determined for the 500 ml. to run out.

It is therefore, one of the objects of this invention to provide for a treatment of a drilling mud which will cause the latter to have a "filtration rate" of less than approximately 45 ml. and at most not more than 55 ml. in the first hour of filtration, said treated mud having a viscosity sufficiently low so that it is pumpable.

When the viscosity of the mud is sufficiently low to permit it to be readily circulated and the filtration rate is within the limits described hereinabove, the mud will ordinarly possess sufficient thixotropic properties for all practical purposes.

It is another object of this invention to provide for a treatment of a drilling mud containing an added inorganic resulting from the reaction of an alkali metal or an alkaline earth metal with a strong mineral acid, such as for example sodium chloride, potassium sulfate and calcium nitrate, said treatment causing the "salt-base" mud to have a filtration rate of less than approximately 45 ml. and at most not more than 55 ml. in the first hour of filtration, said treated mud being pumpable.

The term "performance characteristics" is herein used to include wall building, water-loss and thixotropic properties and viscosity but does not refer to the specific gravity of the mud.

In the usual field operations, it is often necessary to form a cement plug in the hole and to subsequently drill through this plug, thereby contaminating the mud with cement. Mud which has been contaminated with cement is termed "cement-cut mud." It has been observed that such muds usually possess poor performance characteristics in accordance with the quality definitions given hereinabove and that the greater the contamination the poorer the quality. Cement-cut muds often become so viscous in character that it is difficult, and often impossible, to circulate the contaminated material. This increase in apparent viscosity may impart "gas cutting tendencies" to the muds, that is, prevent the escape of gas from the mud, and tend to prevent the proper release of cuttings therefrom. Further, as will be discussed more fully later, such muds form thick, pervious cakes upon the wall of the hole which permit the ready penetration of water into the formation.

Clays, which consist predominately of hydrated silicates of alumina, when suspended in water possess an appreciable electric charge, such charge in general being of a negative character. On the other hand, cement as is well known comprises a complex mixture of compounds of calcium, magnesium, iron, aluminum and silicon. Although it has not been established beyond question and it is not desired to be bound by the theory, it is believed that the poor performance characteristics imparted by the presence of cement to an otherwise satisfactory drilling mud is due in part to the coagulation or flocculation of the negatively charged clay particles by the polyvalent positively charged metallic ions leached from the contaminating cement. Normally by far the largest proportion of the positive ions leached from cement are calcium ions. Muds may also become similarly contaminated during drilling operations by coming in contact with penetrated formations which contain materials, such as gypsum, from which polyvalent metallic ions may be leached by the aqueous phase of the drilling fluid.

Furthermore, depending upon the particular source, even the virgin clays employed for preparing drilling muds may contain materials capable of yielding polyvalent metallic ions when the clay is dispersed in water.

In any event, by whatever means the contamination may take place, it appears that the presence of polyvalent metallic ions either in solution in the aqueous phase and/or in combination with the negatively charged clay particles, is highly undesirable in that such a condition adversely affects the performance characteristics of the mud.

In the past when drilling muds have become contaminated or, in any event, when their apparent viscosities have become undesirably high, it has frequently been the practice to remove the mud from the hole and to dispose of it as useless material. Such practice involved a considerable disposal problem and, furthermore, it entailed considerable expense for the purchase of new mud. It has been the practice in some fields to lower the viscosity of cement-cut muds by the addition of water. In the past this has been highly undesirable inasmuch as such muds normally exhibited excessively high filter rates.

Muds reclaimed by means of chemical treatment, unless properly controlled, will not be of high quality nor will they alleviate the difficulties encountered from the caving of formations. The reason for this is that a treatment which merely controls the viscosity of the mud is insufficient unless attention has also been given to the cake-forming and water-loss properties of the mud and their importance.

It has now been found that drilling muds can be treated with certain reagents which will control both the viscosity and the filtration rate of the mud and that it is possible to add the reagents to the mud either after the contamination has taken place or, in those cases where it is known or expected that the mud is going to be contaminated by undesirable materials, such as for example, when it is anticipated that a cement plug will be drilled through and that the mud will then become contaminated with cement, the reagents can be added to the mud prior to said contamination. This latter type of treatment immunizes the mud against any substantial deterioration in its performance characteristics upon subsequent admixing with the contaminating material, and in some cases it has been found that such contamination after the addition of the reagents which have now been discovered even improves the performance characteristics of the mud. Furthermore, these reagents are so effective in controlling water loss that the viscosity if desired can be controlled merely by the addition of water to the mud either before or after contamination with the cement or similar materials. Illustrative of this point it has been observed that when mud becomes contaminated with cement its viscosity and filtration rate becomes undesirably high, but that these factors can be reduced to desirable values by the addition to the contaminated mud of a mixture of a concentrate comprising about 60% of a sodium salt of mahogany sulfonic acids and about 40% of lubricating oil, sodium gum karaya and water. On the other hand, by adding the mixture of a concentrate comprising about 60% of a sodium salt of mahogany sulfonac acids and about 40% of lubricating oil, sodium gum karaya and water to the mud prior to contamination with cement, the performance characteristics of the mud are improved, and upon the subsequent addition of cement the performance characteristics are still acceptable and in many cases may remain substantially unchanged or may even be improved.

It is another object of this invention to provide for a treatment of mud which will simultaneously control cake-forming and water loss properties, the viscosity and the thixotropic properties of the mud and which will not markedly alter the specific gravity of the mud.

It is an additional object of this invention to provide for a "combination treatment" of muds comprising the addition of one or more materials which will control the viscosity of the mud without acceptably altering its cake-forming properties and a second material or combination of materials which will control the cake-forming properties of the mud without acceptably controlling its viscosity.

It is also an object of this invention to provide for the pretreatment of mud in order to render it immune to the effects of subsequent contamination with cement or similar materials thereby providing for retaining the mud at all times in excellent condition in terms of the desirable properties enumerated hereinabove.

It has been discovered that by a suitable choice of treatment, not only can the viscosity of a mud, and particularly of a contaminated mud, be controlled, but the cake-forming and water-loss properties of the mud, as measured by the filtration rate, can also simultaneously be regulated and maintained at a high quality. It has further been determined that controlling the viscosity of a mud, and especially of a cement-cut mud, does not necessarily control the filtration rate of the mud.

It is desirable in practicing this invention to improve the performance characteristics of a mud not to employ an amount of treating agent or agents in excess of the minimum amount necessary to obtain the desired performance characteristics. If the quantity of reagent exceeds this minimum amount in any great excess the mud may be deleteriously affected. Normally the reagents are added in relatively small proportions in the order of about 0.01% to 2.0% by weight based upon the weight of drilling fluid treated, although under some circumstances as much as 5% by weight or even 10% by weight of some of the reagents may be used. By the application of the above described tests it may readily be determined what the necessary amount of any given reagent or reagents is for any mud.

Before considering the types of reagents comprising the subject matter of this invention, it should first be emphasized that, as might be expected, naturally occurring clays and the muds prepared from them vary considerably in character. For example, they differ in ultimate chemical composition, in amounts and types of colloidal material, and in amounts and types of impurities. Furthermore, the common contaminants which may become included in the mud during its use in drilling operations, namely, calcium hydroxide leached from cement, and gypsum, differ in type, one being a fairly strong base and the other a neutral salt. As a consequence and in view of the complex character of colloidal dispersions, it is only logical to expect that in general the performance characteristics of muds prepared from clays of different origins or even of the same mud contaminated with different materials, will not necessarily be affected in exactly the same manner by the addition of any given treating agent. In spite of these variations it has been found that the treating agents disclosed in the specification when added in proper amount will control the performance characteristics of various muds within acceptable limits.

The methods employed for making performance tests have been outlined in detail above. In determining the effect of a treating agent or agents on a mud, the procedure employed in the laboratory has been to add the desired amount of treating agent or agents to the mud followed by a thorough agitation of the mixture for one hour prior to the conducting of the performance tests. It will be observed that such a procedure completely eliminates any necessity for making a chemical analysis of the mud and, as a consequence, it has been found to be the most practical method which can be employed in the field.

It has been discovered that the performance characteristics of a mud and particularly its water loss properties, can be controlled by the addition to the mud of a treating agent selected from the group comprising the reaction products resulting from the addition of an amine or ammonium hydroxide or a basically reacting compound of an alkali metal to the hydrolysis product of a water-dispersible gum.

It has also been discovered that the performance characteristics of a mud and particularly its water loss properties can be controlled by the addition to the mud of a treating agent selected from the group described immediately above along with a second treating agent selected from the group comprising the alkali metal, amine, and ammonium salts of higher molecular weight carboxylic acids and oil soluble sulfonic acids either singly or in admixture with one another.

By the term "alkali metal" it is meant to include lithium, sodium and potassium.

By the term "basically reacting compound" it is meant to include oxides, hydroxides and other compounds which will react with the acidic products formed by the hydrolysis of water-dispersible gums to form the corresponding salts.

By the term "amines and ammonium hydroxide" it is meant to include not only the hydroxide of the compound known chemically as ammonia, but also the various amines and substituted amines such as for example dipropyl amine and triethanolamine.

The term "higher molecular weight carboxylic acids" is meant to include those organic compounds of the fatty acid type having more than about 10 carbon atoms per molecule such as for example, oleic acid, palmitic acid, linoleic acid, etc. It is also meant to include those other carboxylic acids having more than about 10 carbon atoms and closely related to the fatty acids such as, for example, the naphthenic acids and the rosin acids such as abietic acid.

The "sulfonic acids of relatively high molecular weight" employed to prepare the oil-soluble alkali metal and ammonium salts may be those synthetically produced or those obtained from the treatment of petroleum fractions. The latter are formed when lubricating oil fractions or similiar petroleum fractions are treated with concentrated or fuming sulfonic acid. The so-called "mahogany acids" dissolve in the oil phase, whereas the so-called "green acids" are the water-soluble organic acids which pass into the sludge. After separation of the sludge the "mahogany acids" which are preferred may be recovered in the form of sodium salts by treatment of the acid-treated oil with sodium hydroxide to produce the sodium sulfonates which are then subsequently removed from the oil solution by extraction with alcohol. The other alkali metal salts and the ammonium salts may be obtained from the above sodium salts by well known processes of metathesis. An example of a commercially available oil-soluble alkali metal salt of a higher molecular weight sulfonic acid is a concentrate in lubricating oil, comprising about 60% sodium sulfonates and 40% lubricating oil.

Desirably, but not necessarily, the treating agent selected from the group comprising the alkali metal and ammonium salts of higher molecular weight carboxylic acids and oil-soluble sulfonic acids, may be dispersed in a petroleum or other hydrocarbon oil such as spray oil, a transformer oil extract produced by Edeleanu extraction of a suitable petroleum distillate with sulfur dioxide, a light lubricating oil or even a heavy lubricating oil, prior to introduction into the drilling fluid.

It has further been discovered that the alkali metal and ammonium acid and neutral salts of the various acids of phosphorus such as ortho phosphoric acid, pyrophosphoric acid, hexametaphosphoric acid, etc., when added to drilling fluids in conjunction with a treating agent selected from each of the classes of compounds disclosed hereinabove or only from the first named class of compounds disclosed hereinabove, particularly when the drilling fluid is contaminated with cement or similar materials yielding polyvalent metal ions, results in performance characteristics which are better than can be obtained by the use of these materials alone.

One factor which has not been previously mentioned concerning the chemical treatment of muds is based on the fact that in actual commercial use muds may be exposed to temperatures of as high as 150° F. to 250° F., the temperature depending principally upon the location and the depth at which the drilling is being conducted. It has been observed that many muds which have been chemically treated to improve their performance characteristics tend to deteriorate with respect to these characteristics upon prolonged exposure to temperatures in the neighborhood of 200° F. to 250° F., or even lower as is the case in drilling operations. This is apparently due to the fact that the chemicals added may be hydrolyzed or otherwise affected in such a manner as to alter their original effect upon the performance characteristics of the mud. It might be thought, therefore, that the use of chemicals reacting in this way would be a bar to their practical application in the treatment of muds, and in those cases where the degradation with rise in temperature is rapid, such as in the case of sodium hexametaphosphate, their use may be inadvisable. However, it has been found that many chamicals, which apparently only slowly lose their effectiveness upon exposure to heat, may be utilized. In such cases it is preferable to add the chemical to the mud each day, thereby maintaining a low filtration rate and a low viscosity. The addition of three times as much chemical as is required to maintain the desired performance characteristics over a period of one day will not maintain the performance characteristics over a period of three days. Of course, it is evident that wherever it is feasible, it is preferable to use chemicals whose effect upon the performance characteristics of a mud are not altered by prolonged exposure to elevated temperatures such as may be encountered in the particular zone being drilled, and if such chemical will give the desired performance characteristics according to the tests herein disclosed, such a chemical is the most desirable. In some cases, it has been observed that a certain order of addition will give better performance characteristics than the reverse order of addition. In the examples given below, therefore, unless otherwise noted, it will be considered that the chemicals are added in the order in which they are listed, since they give, when added in such order, the most desirable results.

It has further been discovered that the performance characteristics of a "salt base" mud, and particularly its water loss properties can be controlled by the addition to the mud of a treating agent selected from the group comprising the reaction products resulting from the addition of an amine or ammonium hydroxide or a basically reacting alkali metal compound to the hydrolysis product of a water-dispersible gum.

By the term "water-dispersible" gum it is meant to include, for example, such products as gum karaya, gum sandarac, gum acacia, gum tragacanth, gum arabic, etc.

The water-dispersible gums may be hydrolyzed by dispersing a quantity of the gum in water and subsequently heating to a temperature of about 200° F. or higher. If it is desired to employ temperatures much in excess of 200° F., it will, of course, be necessary to conduct the hydrolysis in an enclosed pressure vessel. The rate of hydrolysis at a given temperature can be accelerated by the addition of a small amount of an acid such as, for example, sulfuric, hydrochloric or acetic acids, or of a base such as caustic soda. After hydrolysis has been completed the reaction mass is neutralized with an amine or ammonium hydroxide or a basically reacting compound of an alkali metal to a pH value in the neighborhood of 10 such as would be indicated by a phenolphthalein indicator. The resulting aqueous solution can then be added as such to the drilling mud for the control of performance characteristics.

Where it is desirable to ship a minimum weight of treating agent the hydrolyzed and neutralized product may be dehydrated to yield a powder. This powder can subsequently be added to the drilling mud directly, or it can be dispersed in a quantity of water prior to addition to the drilling fluid.

The following is an example of the preparation of sodium gum karaya. Approximately 300 ml. of water containing 2.5 grams of sodium hydroxide was heated to 200° F. in a beaker equipped with a stirrer. While continuing heating, 20 grams of gum karaya was added to the solution and the mixture stirred until viscous. The stirring must be sufficient to cause adequate contact of the gum and the caustic soda. The time required for the hydrolysis will vary, but usually a half hour will be sufficient to complete the reaction. Subsequent to the hydrolysis, the pH of the product was adjusted to approximately 10 by the addition of more caustic soda. If the pH had been above 10 due to the use of an excess of caustic soda, a strong mineral acid such as hydrochloric acid could have been added to adjust the pH to the desired value. The resulting product is the material which has been termed "sodium gum karaya" and comprises one of the treating agents of the present invention.

In the practice of this invention in the field, the treating agents may conveniently be added to the circulating mud stream at a point adjacent to the mud pump suction inlet in the mud sump. Thorough admixture of the thus introduced reagents may be assured by rapid recirculation of the mud from the mud sump through a spare slush pump. During treatment, mud samples may be taken from the circulating mud stream at frequent intervals and tested in order to determine when the desired degree of treatment has been effected.

The following examples are presented in the nature of illustrations of the practical value of the processes of the invention and are not to be construed as limiting the invention in any sense.

*Example I*

A Santa Maria Valley clay was mixed with water to give a fluid weighing 78.5 pounds per cubic foot. To a given volume of this fluid was added an equal volume of water in which had been dispersed various treating agents and the viscosity and filtration rate were determined on each sample by the procedures already described.

The data from these several experiments are given in the following tabulation:

| | Treating Agent Added, Per Cent by Weight of the Final Drilling Fluid | Marsh Viscosity 500/500, Secs. | Filtration Rate, ml. | |
|---|---|---|---|---|
| | | | 1st 5 Min. | 1st 15 Min. |
| a | No added treating agent | 20 | 18.5 | 34.5 |
| b | 2.0% a concentrate comprising about 60% of a sodium salt of mahogany sulfonic acids and about 40% of lubricating oil | 22 | -------- | 3.5 |
| c | 2.0% a concentrate comprising about 60% of a sodium salt of mahogany sulfonic acids and about 40% of lubricating oil 0.1% sodium gum sandarac | 20 | 1.3 | 3.0 |
| d | 2.0% a concentrate comprising about 60% of a sodium salt of mahogany sulfonic acids and about 40% of lubricating oil 0.1% sodium gum karaya | 22 | 1.1 | 2.6 |
| e | 2.0% sodium tall oil soap [1] 0.1% gum acacia | 25 | 1.4 | 3.0 |
| f | 0.5% sodium pyrophosphate | 21 | 7.5 | 15.8 |

[1] Tall oil is an article of commerce obtained as a by-product from the Swedish process for cellulose pulp making. Sweet liquor from the process separates into two layers, the upper of which is the crude tall oil, which may be purified by distillation to yield a product containing both fatty acids and rosin-type acids.

*Example II*

The same initial fluid was used as for the experiments described in Example I. To seven volumes of this fluid were added three volumes of water in one case and in another three volumes of water containing sodium gum karaya. The viscosities and filtration rates of these two samples were determined and are recorded in the following tabulation:

| | Treating Agent Added, Per Cent by Weight of the Final Drilling Fluid | Marsh Viscosity 500/500, Secs. | Filtration Rate, ml. | |
|---|---|---|---|---|
| | | | 1st 5 Min. | 1st 15 Min. |
| a | No added treating agent | 23.5 | 15 | 28 |
| b | 0.4% sodium gum karaya | 36.5 | 3.0 | 6.3 |

*Example III*

The same fluid was used as for the experiments described in Example I. To a given volume of this fluid was added an equal volume of water in which had been dispersed various treating agents, and subsequently the drilling fluid was admixed with 0.7% by weight of hydrated cement. The viscosities and filtration rates of these samples were determined and are recorded in the following tabulation:

| | Treating Agent Added, Per Cent by Weight of the Final Drilling Fluid | Marsh Viscosity 500/500, Secs. | Filtration Rate, ml. | |
|---|---|---|---|---|
| | | | 1st 5 Min. | 1st 15 Min. |
| a | No added treating agent | 22 | 25.0 | 44.0 |
| b | 2.0% a concentrate comprising about 60% of a sodium salt of mahogany sulfonic acids and about 40% of lubricating oil | 22 | -------- | 10.0 |
| c | 2.0% a concentrate comprising about 60% of a sodium salt of mahogany sulfonic acids and about 40% of lubricating oil 0.5% quebracho | 21 | 1.7 | 4.2 |
| d | 2.0% a concentrate comprising about 60% of a sodium salt of mahogany sulfonic acids and about 40% of lubricating oil 0.1% sodium gum sandarac | 21 | 2.4 | 5.2 |
| e | 2.0% a concentrate comprising about 60% of a sodium salt of mahogany sulfonic acids and about 40% of lubricating oil 0.1% sodium gum karaya | 24 | 1.8 | 3.5 |
| f | 2.0% sodium tall oil soap 0.1% gum acacia | 58 | 1.5 | 3.8 |

*Example IV*

The same initial fluid was used as for the experiments described in Example I. To a given volume of this fluid was added an equal volume of water in which was dispersed various treating agents. Subsequently, 6% by weight of sodium chloride, based on the weight of the final drilling fluid, was added. The viscosities and filtration rates of these samples were determined and are recorded in the following tabulation:

| | Treating Agent Added, Per Cent by Weight of the Final Drilling Fluid | Marsh Viscosity 500/500, Secs. | Filtration Rate, ml. | |
|---|---|---|---|---|
| | | | 1st 5 Min. | 1st 15 Min. |
| a | No added treating agent | 23 | -------- | 58.2 |
| b | 1.0% starch | 23.5 | 17.5 | 30.2 |
| c | 0.5% sodium gum karaya | 58 | -------- | 7.2 |
| d | 1.0% sodium gum karaya | -------- | 1.9 | 3.5 |
| e | 1.0% sodium gum tragacanth | 62 | 1.7 | 3.5 |

*Example V*

A drilling fluid was prepared by mixing six pounds of a bentonite clay with ninety-four pounds of water. To samples of this mud various treating agents were added and the viscosities and filtration rates then determined by the procedures described hereinabove. The data from these several experiments are given in the following tabulation:

| | Treating Agent Added, Per Cent by Weight of the Final Drilling Fluid | Marsh Viscosity 500/500, Secs. | Filtration Rate, ml. | |
|---|---|---|---|---|
| | | | 1st 5 Min. | 1st 15 Min. |
| a | No added treating agents | 56 | 5.1 | 9.5 |
| b | 1.0% a concentrate comprising about 60% of a sodium salt of mahogany sulfonic acids and about 40% of lubricating oil | 56 | 3.0 | 7.2 |
| c | 1.0% a concentrate comprising about 60% of a sodium salt of mahogany sulfonic acids and about 40% of lubricating oil 0.1% gum acacia | 60 | 3.5 | 6.8 |
| d | 0.5% sodium pyrophosphate | 24 | -------- | 9.2 |
| e | 1.0% a concentrate comprising about 60% of a sodium salt of mahogany sulfonic acids and about 40% of lubricating oil 0.1% sodium gum karaya 0.5% sodium pyrophosphate | 41 | 2.4 | 5.3 |

The drilling fluid described in Example Ia comprises a mixture of Santa Maria Valley clay and water. Although possessing an acceptable viscosity, it has such a high filtration rate that it would normally not be used in drilling operations. The addition of as much as 0.5% by weight of sodium pyrophosphate (a widely used treating agent) to the drilling mud, as indicated in Example If, improved the filtration rate to some extent but it was still undesirably high. The addition of 2.0% by weight of a concentrate comprising about 60% of a sodium salt of mahogany sulfonic acids and about 40% of lubricating oil gave a drilling fluid having acceptable performance characteristics (Example Ib). However, even better performance characteristics were obtained by using a combination of a concentrate comprising about 60% of a sodium salt of mahogany sulfonic acids and about 40% of lubricating oil with sodium gum sandarac, sodium gum karaya, or gum acacia as shown in Example Ic, Id, and Ie, respectively.

Example IIb shows the marked improvement in filtration rate which can be obtained by the addition of 0.5% of sodium gum karaya alone to a drilling fluid similar to that of Example Ia and having an undesirably high filtration rate.

Example IIIa shows the effect of cement contamination on the drilling fluid of Example Ia. Example IIIb demonstrates that the addition of a concentrate comprising about 60% of a sodium salt of mahogany sulfonic acids and about 40% of lubricating oil to the drilling fluid, followed by cement contamination results in a material which is still usable for drilling operations. Examples IIIc, IIId, IIIe, and IIIf demonstrate that the use of quebracho, sodium gum sandarac, sodium gum karaya, and gum acacia respectively, in conjunction with a concentrate comprising about 60% of a sodium salt of mahogany sulfonic acids and about 40% of lubricating oil are all superior to a concentrate comprising about 60% of a sodium salt of mahogany sulfonic acids and about 40% of lubricating oil alone in overcoming the effects of contamination with cement.

Example IVa shows the effect on performance characteristics of adding sodium chloride in appreciable quantities to the drilling fluid of Example Ia. Example IVb shows that starch (a material presently used for overcoming the effects of salt in drilling fluids) improves performance characteristics but not to an acceptable extent. Examples IVc, IVd, and IVe demonstrate that the compounds comprising the present invention are effective in controlling the performance characteristics of a "salt base" mud.

The drilling fluid described in Example Va, comprising a mixture of bentonite clay and water, possessed good performance characteristics and would be usable without treatment in the drilling of a well provided, of course, that it did not become contaminated with materials such as cement, gypsum, etc. However, as has already been indicated, the lower the filtration rate the more desirable the mud for drilling operations. Example Vb shows that the use of a concentrate comprising about 60% of a sodium salt of mahogany sulfonic acids and about 40% of lubricating oil alone gives some improvement in filtration rate. Example Vd shows that 0.5% of sodium pyrophosphate improves the viscosity but has little or no effect on the filtration rate. Examples Vc and Ve show that the combination of a concentrate comprising about 60% of a sodium salt of mahogany sulfonic acids and about 40% of lubricating oil with gum acacia and with sodium gum karaya plus sodium pyrophosphate, respectively, gives muds of improved performance characteristics.

Other modifications of this invention which would occur to one skilled in the art may be made, and these are to be considered within the scope of the invention as defined in the following claims.

We claim:

1. A drilling fluid stable to salines encountered in drilling, comprising water, finely-divided inorganic solids suspended therein, and a treating agent prepared by hydrolyzing a water dispersible gum in a water dispersion at a temperature of at least about 200° F. in the absence of an oxidizing agent, and neutralizing the product with a neutralizing agent of the group consisting of ammonia, an amine and a basically reacting compound of an alkali metal, said treating agent being added in an amount between about 0.01% and 10% by weight of the drilling fluid, sufficient to reduce the filtration rate of the drilling fluid to less than about 45 ml. in the first hour.

2. A drilling fluid according to claim 1 in which the water dispersible gum is karaya.

3. A drilling fluid according to claim 1 in which the water dispersible gum is sandarac.

4. A drilling fluid according to claim 1 in which the water dispersible gum is tragacanth.

5. A drilling fluid according to claim 1 in which the finely divided inorganic solid is clay.

6. A drilling fluid according to claim 1 which also is contaminated with cement.

7. A salt base drilling fluid which comprises water, an inorganic salt dissolved therein to the extent of 1 to 10% by weight, finely-divided inorganic solids suspended therein, and a treating agent prepared by hydrolyzing a water dispersible gum in a water dispersion at a temperature of at least about 200° F. in the absence of an oxidizing agent, and neutralizing the product with a neutralizing agent of the group consisting of ammonia, an amine and a basically reacting compound of an alkali metal, said treating agent being added in an amount between about 0.01% and 10% by weight of the drilling fluid, sufficient to reduce the filtration rate of the drilling fluid to less than about 45 ml. in the first hour.

8. A drilling fluid according to claim 7 in which the inorganic salt is sodium chloride.

9. A drilling fluid according to claim 7 in which the inorganic salt is sodium chloride and the neutralizing agent is a basically reacting compound is an alkali metal compound.

10. A composition as claimed in claim 7 which also contains a bactericide.

11. A drilling fluid according to claim 7 in which the finely divided inorganic solid is clay.

12. A drilling fluid comprising water, finely-divided inorganic solids suspended therein, a first treating agent prepared by hydrolyzing a water dispersible gum in a water dispersion at a temperature of at least about 200° F. in the absence of an oxidizing agent, and neutralizing the product with a neutralizing agent of the group consisting of ammonia, an amine and a basically reacting compound of an alkali metal, and a second treating agent selected from the group consisting of the alkali metal, amine, and ammonium salts of higher molecular weight carboxylic acids and oil-soluble sulfonic acids and mixtures thereof, said treating agents being added in amounts between about 0.01% and 10% by weight of the drilling fluid sufficient to reduce the filtration rate of the drilling fluid to less than about 45 ml. in the first hour.

13. A drilling fluid according to claim 12 in which the second treating agent is sodium mahogany sulfonate and the gum is gum karaya.

14. A drilling fluid according to claim 12 in which the gum is karaya, the neutralizing agent is a basically reacting sodium compound, the second treating agent is sodium mahogany sulfonate, and a third treating agent consisting of 0.01% to 10% by weight of sodium pyrophosphate is also employed.

15. A drilling fluid according to claim 12 in which the finely-divided inorganic solid is clay.

16. A composition as claimed in claim 12 in which the second treating agent is the sodium compound of oil soluble sulfonic acid (mahogany acid).

17. A composition as claimed in claim 12 in which the second treating agent is the reaction product of an alkali metal hydroxide and tall oil.

PAUL W. FISCHER.
RAYMOND A. ROGERS.

REFERENCES CITED

The following references are of record in the file of this patent:

UNITED STATES PATENTS

| Number | Name | Date |
|---|---|---|
| 2,109,858 | Cannon | Mar. 1, 1938 |
| 2,129,913 | Cross et al. | Sept. 13, 1938 |
| 2,174,027 | Ball | Sept. 26, 1939 |
| 2,209,591 | Barnes | July 30, 1940 |
| 2,211,688 | Byck | Aug. 13, 1940 |
| 2,294,877 | Wayne | Sept. 1, 1942 |
| 2,295,067 | Williams | Sept. 8, 1942 |
| 2,297,650 | Mazee | Sept. 29, 1942 |
| 2,336,171 | Freeland | Dec. 7, 1943 |
| 2,337,296 | Kennedy | Dec. 21, 1943 |
| 2,350,154 | Dawson | May 30, 1944 |

OTHER REFERENCES

Commercial Organic Analyses, Allen, vol. I, 3rd ed., page 424, year, 1898.

Certificate of Correction

Patent No. 2,518,439　　　　　　　　　　　　　　　　　　　　August 15, 1950

PAUL W. FISCHER ET AL.

It is hereby certified that error appears in the printed specification of the above numbered patent requiring correction as follows:

Column 4, line 67, after the word "inorganic" insert *salt*; column 8, line 43, for "sulfonic" read *sulfuric*; line 73, after "metal" insert , *amine,*; column 14, lines 33 and 34, strike out "compound is an";

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*